United States Patent
Tujkovic et al.

(10) Patent No.: US 8,514,728 B2
(45) Date of Patent: Aug. 20, 2013

(54) METHODS AND SYSTEMS FOR ESTIMATING TEMPORAL CORRELATION OF A PROPAGATION CHANNEL

(75) Inventors: Djordje Tujkovic, Santa Clara, CA (US); David Garrett, Santa Clara, CA (US); Ying Xia, Santa Clara, CA (US); Erik Lindskog, Santa Clara, CA (US); Brett Schein, Santa Clara, CA (US); Varaprasad Javvadi, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1088 days.

(21) Appl. No.: 11/821,287

(22) Filed: Jun. 22, 2007

(65) Prior Publication Data

US 2008/0123544 A1     May 29, 2008

Related U.S. Application Data

(60) Provisional application No. 60/816,064, filed on Jun. 22, 2006.

(51) Int. Cl.
*H04L 12/26* (2006.01)

(52) U.S. Cl.
USPC ............... 370/252; 370/328; 455/452.2

(58) Field of Classification Search
None
See application file for complete search history.

(56) References Cited

U.S. PATENT DOCUMENTS

| | | | |
|---|---|---|---|
| 6,351,499 B1 * | 2/2002 | Paulraj et al. | 375/267 |
| 6,377,813 B1 * | 4/2002 | Kansakoski et al. | 455/522 |
| 7,120,440 B2 * | 10/2006 | Cho et al. | 455/441 |
| 7,142,864 B2 * | 11/2006 | Laroia et al. | 455/450 |
| 7,200,127 B1 * | 4/2007 | Lee et al. | 370/335 |
| 7,340,375 B1 * | 3/2008 | Patenaud et al. | 702/180 |
| 2003/0157900 A1 * | 8/2003 | Gaal et al. | 455/69 |
| 2003/0204615 A1 * | 10/2003 | Wei et al. | 709/232 |
| 2004/0027994 A1 | 2/2004 | Baines | |
| 2004/0057394 A1 * | 3/2004 | Holtzman | 370/317 |
| 2004/0141460 A1 * | 7/2004 | Holtzman et al. | 370/216 |
| 2004/0224725 A1 * | 11/2004 | Kim et al. | 455/561 |
| 2005/0018641 A1 * | 1/2005 | Zhao et al. | 370/342 |
| 2005/0047530 A1 | 3/2005 | Lee et al. | |
| 2005/0190718 A1 * | 9/2005 | Holtzman et al. | 370/328 |
| 2005/0191965 A1 * | 9/2005 | Yu et al. | 455/67.16 |
| 2005/0201474 A1 * | 9/2005 | Cho et al. | 375/260 |
| 2005/0213682 A1 | 9/2005 | Han et al. | |
| 2006/0079184 A1 * | 4/2006 | Do et al. | 455/63.1 |
| 2006/0160556 A1 * | 7/2006 | Mueller et al. | 455/522 |
| 2006/0269153 A1 | 11/2006 | Shi et al. | |
| 2007/0104087 A1 * | 5/2007 | Tee et al. | 370/208 |
| 2007/0126636 A1 | 6/2007 | Zhang et al. | |
| 2008/0031368 A1 * | 2/2008 | Lindoff et al. | 375/260 |

* cited by examiner

*Primary Examiner* — Brian Roberts
(74) *Attorney, Agent, or Firm* — Sterne, Kessler, Goldstein & Fox P.L.L.C.

(57) ABSTRACT

Methods and systems for estimating Temporal Correlation (TC) of a propagation channel are provided. In an embodiment, a method for estimating the TC of the propagation channel comprises obtaining multiple channel quality reports of the propagation channel and estimating the TC of the propagation channel based on the multiple channel quality reports.

24 Claims, 7 Drawing Sheets

US 8,514,728 B2

METHODS AND SYSTEMS FOR ESTIMATING TEMPORAL CORRELATION OF A PROPAGATION CHANNEL

This application claims the benefit of U.S. Provisional Application Number 60/816,064, filed Jun. 22, 2006.

BACKGROUND

The present invention generally relates to communication networks. More specifically, the present invention relates to methods and systems for estimating temporal correlation (TC) of a propagation channel in a communication network.

In a communication network, differences between path propagation of multi-path components can result in a TC. An estimate about the TC and an aggregate power across all multi-path propagation channels can assist in optimizing the performance of channel estimation of the multi-path propagation channels. Accordingly, the performance of channel estimation algorithms in Uplink (UL), Link Adaptation (LA), MAC (Medium Access Control) scheduling and Power Control algorithms (PC) in both UL and Downlink (DL) and optimization of the feedback resources in the communication network can be optimized through the knowledge of TC.

In order to estimate the TC of a propagation channel for UL transmission at a wireless base station, regular observations of the UL transmission may be required at the wireless base station. However, due to the bursty nature of UL transmission, regularized observation of UL transmission for explicit measurement at the wireless base station may be impeded. Further, due to lower Signal-to-Interference Ratios (SIRs) in UL transmission, the TC of another signal interfering with the UL transmission may contribute to errors in the estimation of the TC of the channel propagating the UL transmission.

Moreover, presence of a symbol-to-symbol interference variance and frame-to-frame interference variance in the UL transmission may augment the estimation error of the TC of the propagation channel. In the existing state of the art, the TC of the propagation channel can be estimated with a significant accuracy at a wireless mobile subscriber. However, a provision for conveying the estimated TC information of the propagation channel from the wireless mobile subscriber to the wireless base station is absent. Consequently, the wireless base station may be expected to estimate the TC of the propagation channel for all wireless mobile subscribers subscribed to the wireless base station.

SUMMARY

An embodiment of the invention provides a method for estimating TC of a propagation channel in a communication network.

Embodiments listed below includes a method for estimating TC of a propagation channel in a communication network. The method includes obtaining multiple channel quality reports of the propagation channel. The method further includes estimating the temporal correlation of the propagation channel based on the multiple channel quality reports.

In an embodiment, the TC of the propagation channel can be estimated at a wireless mobile subscriber based on multiple channel quality reports. In another embodiment, a wireless base station can estimate the TC of the propagation channel based on the multiple channel quality reports generated by the wireless mobile subscriber.

BRIEF DESCRIPTION OF DRAWINGS

A more complete appreciation of the present invention is provided by reference to the following detailed description when considered in conjunction with the accompanying drawings in which reference symbols indicate the same or similar components, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Various embodiments described herein provide methods and systems for estimating Temporal Correlation (TC) of a propagation channel in a communication network. Multiple channel quality reports of the propagation channel are generated at a wireless mobile subscriber. Subsequently, the generated multiple channel quality reports are obtained. Using the multiple channel quality reports, the TC of the propagation channel in the communication network is estimated.

Figure 1:
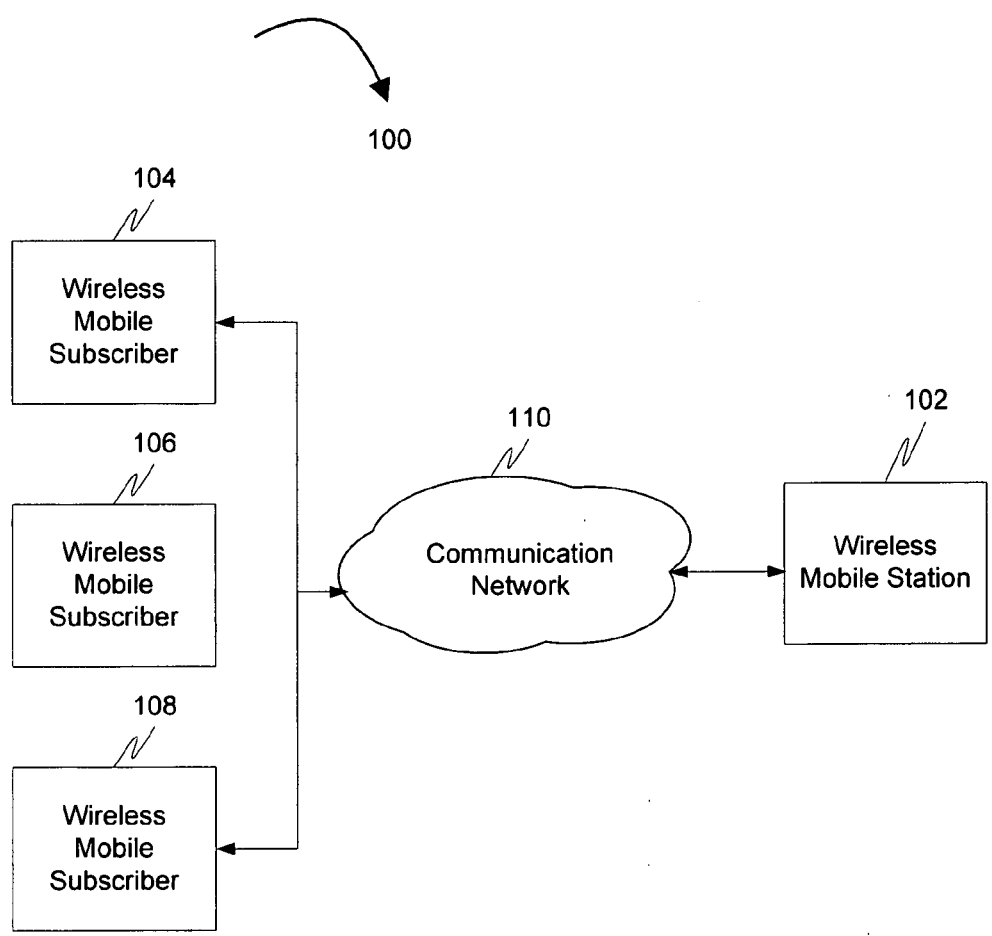
FIG. 1 is a block diagram showing an environment (that is exemplary) in which various embodiments of the invention may function.

FIG. 1 is a block diagram showing an environment 100 (that is exemplary) in which various embodiments of the invention may function. Environment 100 includes a wireless base station 102 and a plurality of wireless mobile subscribers. Wireless base station 102 communicates with one or more of wireless mobile subscriber 104, wireless mobile subscriber 106, and wireless mobile subscriber 108 through communication network 110. It would be apparent to a person skilled in the art that wireless base station 102 may communicate with more than three wireless mobile subscribers. Communication network 110, for example, may be Orthogonal Frequency Division Multiplexing (OFDM) communication network, Orthogonal Frequency Division Multiple Access (OFDMA) communication network, Code Division Multiple Access (CDMA). In an Up Link (UL) transmission, data may be transmitted from one or more of wireless mobile subscriber 104, wireless mobile subscriber 106 and wireless mobile subscriber 108 through a propagation channel that has a multi-path in communication network 110 to wireless base station 102. The propagation channel may have a particular path. Similarly, during DL, data can be transmitted from wireless base station 102 through the propagation channel in communication network 110 to wireless mobile subscriber 104.

Wireless base station 102 may transmit signal in a DL transmission to wireless mobile subscriber 104. The DL transmission may take a multi-path route to reach wireless mobile subscriber 104, if wireless mobile subscriber 104 is out of direct line of sight with wireless base station 102. Additionally, the DL transmission may take a multi-path route due to the change in position of wireless mobile subscriber 104 relative to wireless base station 102 in communication network 110. Therefore, wireless mobile subscriber 104 may be out of a direct line of sight with wireless base station 102. In this case, a Temporal Correlation (TC) may exist between the multi-path components of the DL transmission.

Similarly, in a UL transmission, wireless mobile subscriber 104 transmits signal to wireless base station 102. The UL transmission may take a multi-path for reaching wireless base station 102 through the propagation channel in communication network 110. As a result, the multi-path components related to UL transmission arrive at wireless base station 102 at different times. As a result, a TC may exist between the multi-path components of the UL transmission.

Figure 2:
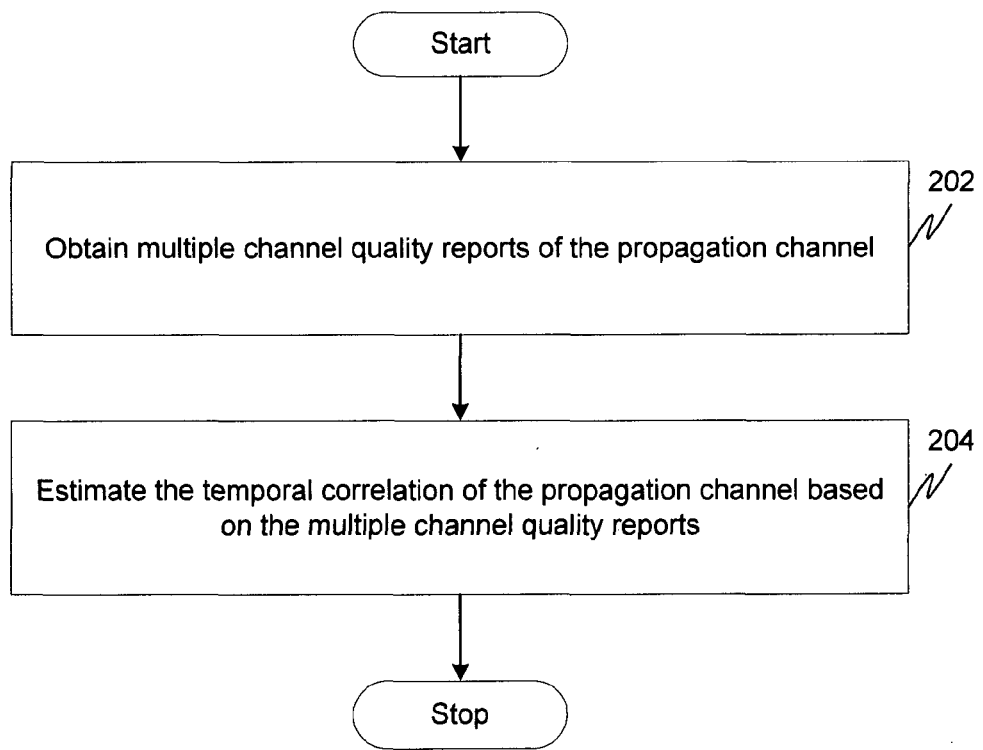
FIG. 2 is a flowchart for estimating TC of a propagation channel in a communication network, in accordance with an embodiment.
Figure 3:
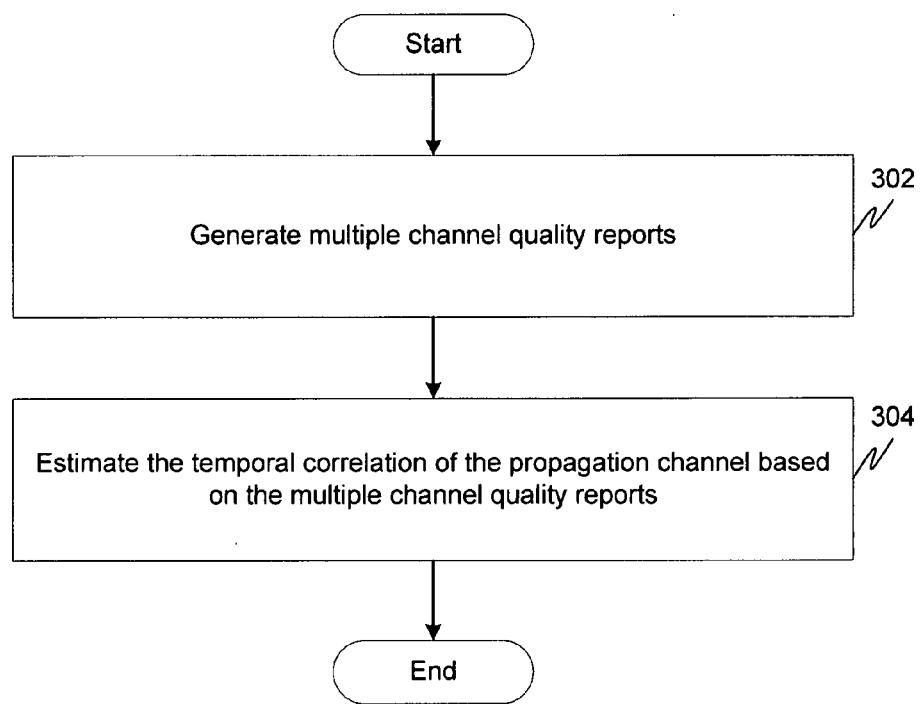
FIG. 3 is a flowchart for estimating TC of a propagation channel at a wireless mobile subscriber in a communication network, in accordance with an embodiment.

FIG. 2 is a flowchart for estimating a TC of a propagation channel in communication network 110, in accordance with an embodiment. Wireless mobile subscriber 104 may receive data from wireless base station 102 in a DL transmission through the propagation channel. It will be apparent to a person skilled in the art that the method is applicable to each of wireless mobile subscriber 106 and wireless mobile subscriber 108. The propagation channel of the DL transmission may have multi-path. At 202, multiple channel quality reports of the propagation channel are obtained. In an embodiment, multiple channel quality reports are generated by wireless mobile subscriber 104. This is further explained in conjunction with FIG. 3 given below. The multiple channel quality reports may include propagation channel measurements of one or more of Receive Signal Strength Indication (RSSI), Signal-to-Noise Ratio (SNR), and Signal-to-Interference-plus-Noise Ratio (SINR) of signals transmitted through the propagation channel in the DL transmission. After obtaining the multiple channel quality reports, the TC of the propagation channel is estimated based on the multiple channel quality reports at 204. A computation is performed on the multiple channel quality reports and a spectral analysis is performed on the computed multiple channel quality reports to estimate the TC of the propagation channel. The TC of the propagation channel may be estimated by wireless mobile subscriber 104. This is further explained in detail in conjunction with FIG. 3 given below. Alternatively, the TC of the propagation channel may be estimated by wireless bases station 102. This is further explained in conjunction with FIG. 4 given below.

FIG. 3 is a flowchart for estimating TC of a propagation channel at wireless mobile subscriber 104 in communication network 110, in accordance with an embodiment. In a DL transmission, signal is transmitted from wireless base station 102 to wireless mobile subscriber 104. Wireless mobile subscriber 104 measures the propagation channel of one or more parameters on pilots of the signal in the DL transmission. A parameter for example may be one of, but not limited to, the RSSI, the SNR, and the SINR. The propagation channel of one or more parameters measured on the pilots depends on the mobility of wireless mobile subscriber 104 and the multi-path richness or the frequency selectivity of the propagation channel in communication network 110. Based on the measured propagation channel of one or more parameters on the pilots, wireless mobile subscriber 104 generates the multiple channel quality reports at 302. The multiple channel quality reports include propagation channel measurements for one or more parameters. At 304, based on the multiple channel quality reports, wireless mobile subscriber 104 estimates the TC of the propagation channel.

Figure 4:
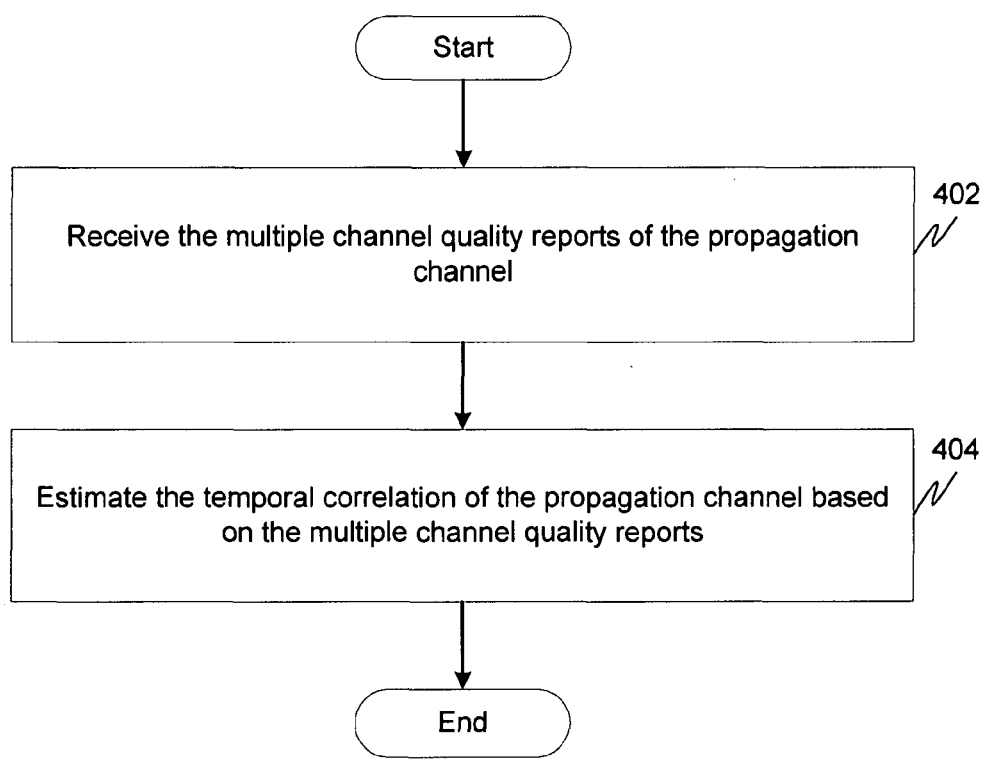
FIG. 4 is a flowchart for estimating TC of a propagation channel at a wireless base station in a communication network, in accordance with an embodiment.

FIG. 4 is a flowchart for estimating TC of a propagation channel at wireless base station 102 in communication network 110, in accordance with an embodiment. After receiving signal in a DL transmission on the propagation channel, wireless mobile subscriber 104 generates multiple channel quality reports of the propagation channel. This has been explained in conjunction with FIG. 3 given above.

Figure 5:
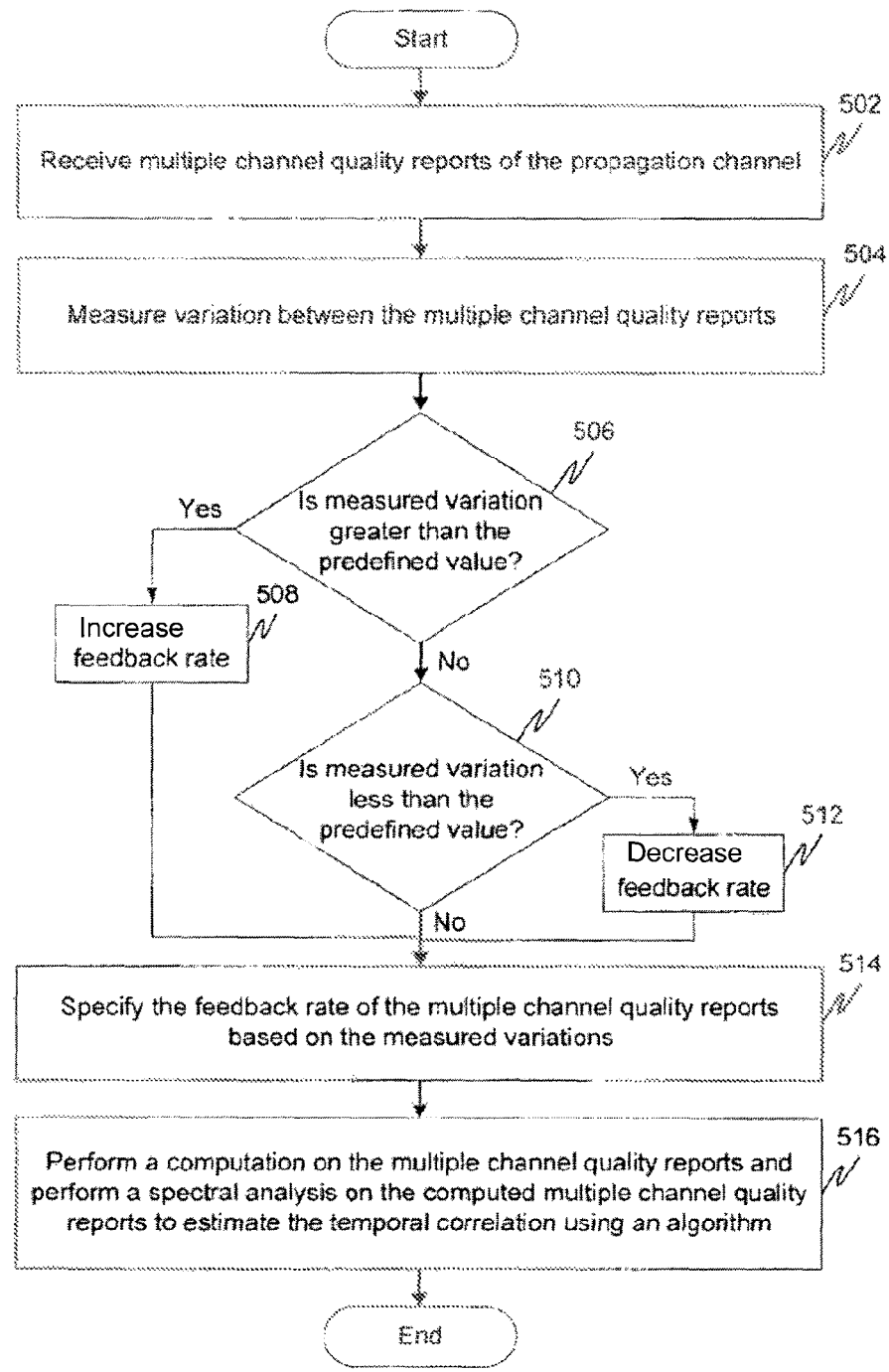
FIG. 5 is a flowchart for estimating TC of a propagation channel at a wireless base station in a communication network, in accordance with another embodiment.

At 402, the multiple channel quality reports of the propagation channel generated at wireless mobile subscriber 104 are received at wireless base station 102. Wireless base station 102 measures a variation between the multiple channel quality reports received from wireless mobile subscriber 104, which is related to the feedback rate for receiving the multiple channel quality reports. For example, a first channel quality report and a second quality report transmitted from wireless mobile subscriber 104 may be received at wireless base station 102 with a signal power of 4 dB and 2 dB respectively. In such a case, the variation between the feedback rate with respect to the first channel quality report and second channel quality report is 2 dB. Thereafter, wireless base station 102 compares the measured variation with a predefined value. This is further explained in detail in conjunction with FIG. 5 given below. The predefined value to which the variation in the multiple channel quality reports are compared, is determined by wireless base station 102 for obtaining the multiple channel quality reports from wireless mobile subscriber 104 at a feedback rate. The predefined value is determined such that the communication between wireless base station 102 and wireless mobile subscriber 104 is optimized, when wireless mobile subscriber 104 initially subscribes to wireless base station 102.

Based on the comparison of the measured variation with the predefined value, wireless base station 102 may specify a feedback rate of the multiple channel quality reports to wireless mobile subscriber 104. This is further explained in conjunction with FIG. 5 given below. After the multiple channel quality reports are received from wireless mobile subscriber 104, the TC of the propagation channel is estimated at wireless base station 102 based on the multiple channel quality reports at 404. The TC of the propagation channel related to wireless mobile subscriber 104 may be estimated based on the measured variation between the multiple channel quality reports. Thereafter, a computation may be performed on the multiple channel quality reports and performing a spectral analysis on the result of the computations using an algorithm. The algorithm may be Fast Fourier Transform (FFT). The estimated TC may correspond to the aggregate power across each multi-path of the propagation channel of wireless mobile subscriber 104. Alternately, the estimated TC may correspond to a particular multi-path of the propagation channel. The estimated TC may be used for LA, PC, MAC, and channel estimation. This is further explained in detail in conjunction with FIG. 5 given below.

FIG. 5 is a flowchart for estimating TC of a propagation channel at wireless base station 102 in communication network 110, in accordance with another embodiment. At 502, wireless base station 102 receives multiple channel quality reports generated at wireless mobile subscriber 104.

At 504, wireless base station 102 measures variation between the multiple channel quality reports received from wireless mobile subscriber 104. The variation can be used to adjust the feedback rate of receiving the multiple channel quality reports from wireless mobile subscriber 104. Subsequently, at 506, a check is performed to determine if the measured variation between the multiple channel quality reports is greater than the predefined value. If the measured variation between the multiple channel quality reports is greater than the predefined value, at 508 wireless base station 102 increases the feedback rate for receiving the multiple channel quality reports.

For example, wireless base station 102 may receive multiple channel quality reports that include a first channel quality report, a second channel quality report, and a third channel quality report from wireless mobile subscriber 104 with signal powers of 3 dB, 1 dB and 0.5 dB respectively. Further, the predefined value related to the variation in multiple channel quality reports may be set to 1 dB by the wireless base station 102. The variation in multiple channel quality reports measured by wireless base station 102 between the first channel quality report and the second channel quality report is 2 dB. Similarly, the variation in multiple channel quality reports measured by wireless base station 102 between the second channel quality report and the third channel quality report is 0.5 dB. As a result, the variation in multiple channel quality reports measured by wireless base station 102 between the first channel quality report, the second channel quality report, and the third channel quality report has an average value of 1.25 dB, which is greater than the predefined value of 1 dB. Consequently, wireless base station 102 increases the feedback rate for receiving the multiple channel quality reports from wireless mobile subscriber 104 and communicates the information regarding the increased feedback rate to wireless mobile subscriber 104. The measured variation may increase from the predefined value if relative position of wireless mobile subscriber 104 to wireless base station 102 is changing fast.

On the contrary, if the measured variation between the multiple channel quality reports is not greater than the predefined value, at 510, a check is performed to determine if the measured variation is less than the predefined value. If the measured variation is less than the predefined value, at 512 wireless base station 102 decreases the feedback rate for receiving the multiple channel quality reports. For example, wireless base station 102 may receive multiple channel quality reports that include a first channel quality report, a second channel quality report, and a third channel quality report from wireless mobile subscriber 104 with signal powers of 1 dB, 0.5 dB and 0.5 dB respectively. Further, the predefined value related to the variation in multiple channel quality reports may be set to 1 dB by the wireless base station 102. The variation in feedback rate measured by wireless base station 102 between the first channel quality report and the second channel quality report 2 is 0.5 dB. Similarly, the variation in feedback rate measured by wireless base station 102 between the second channel quality report and the third channel quality report is 0 dB. As a result, the variation in multiple channel quality reports measured by wireless base station 102 between the first channel quality report, the second channel quality report, and the third channel quality report has an average value of 0.25 dB, which is less than the predefined value of 1 dB. Consequently, wireless base station 102 decreases the feedback rate for receiving the multiple channel quality reports and communicates information regarding the decreased feedback rate to wireless mobile subscriber 104. The measured variation may decrease from the predefined value if relative position of wireless mobile subscriber 104 to wireless base station 102 is changing slowly.

Thereafter, at 514, the increase or decrease in the feedback rate of receiving the multiple channel quality reports, based on the measured variations is specified to wireless mobile subscriber 104 from wireless base station 102. The variation in the multiple channel quality reports is measured repeatedly at wireless base station 102; therefore, the feedback rate of receiving the multiple channel quality reports can be modified repeatedly by wireless base station 102 until a satisfactory feedback rate desired at wireless base station 102 is achieved.

At 516, a computation is performed on the multiple channel quality reports and subsequently, a spectral analysis is carried out on the computed multiple channel quality reports. The spectral analysis on the computed multiple channel quality reports is performed in order to estimate the TC of the propagation channel related to wireless mobile subscriber 104 using an algorithm. In an embodiment, the spectral analysis can be, applying a reduced point Fast Fourier Transform (FFT) on the computed multiple channel quality reports for determining the level crossing rate related to the propagation channel in communication network 110. A Doppler shift associated with the propagation channel of communication network 110 can be calculated using the level crossing rate determined using the FFT of the multiple channel quality reports. The Doppler shift of the propagation channel in communication network 110 provides an estimate of the TC of the propagation channel. It can be apparent to those skilled in the art that any spectral analysis algorithm other than FFT can be employed for processing the multiple channel quality report in order to estimate the Doppler shift of the propagation channel.

In an exemplary embodiment, the computation on the multiple channel quality reports for estimating the TC of the propagation channel can be performed as follows:

$$S = S' - \min(S')$$

In the above equation, S' denotes a vector of size, for example, 50 including a plurality of per frame SINR values of the UL transmission obtained at wireless base station 102 from wireless mobile subscriber 104 through the propagation channel in communication network 110. In an embodiment, S' may include a plurality of per frame SNR values or a plurality of RSSI values, which are related to the DL traffic. The minimum per frame SINR value of S' is subtracted from each of the plurality of per frame SINR values to obtain another vector S as described by the abovementioned equation.

An auto-correlation A(m) of the vector S can be calculated as:

$$A(m) = \sum_{i=1}^{n} \{S(n) * S(n+m)\}$$

Where:

n denotes the total number of per frame SINR values; and m is an integer that can range from 0 to 32.

A vector R can be calculated through a component-wise square root computation as:

$$R = \sqrt{A(m)}$$

Further, another vector P can be computed as:

$$P(r) = R(r-1) - R(r)$$

Where r is an integer and the value of r can range from 1 to 32.

Subsequent to computing the vector P, a reduced size FFT such as a 32-point FFT is applied on P to obtain $P_{FFT}$. An index 'max_index' related to the maximum absolute value of $P_{FFT}$ is identified and scaled accordingly to compute the Doppler shift of the propagation channel as given below:

$$\text{Measured\_Doppler} = \frac{\text{max\_index}}{(\text{FFT\_size} * T_{CQI} * T_{Frame})}$$

Where:
FFT_size denotes the size of the FFT applied on P;
$T_{CQI}$ denotes the feedback rate of the multiple channel quality reports indicated in number of frames; and
$T_{Frame}$ denotes the duration of a frame associated with the DL traffic in seconds.

The Doppler shift computed above provides an estimation of the TC of the propagation channel in communication network 110.

In another embodiment, the computation performed on the multiple channel quality reports for estimating the TC of the propagation channel as described above, can be augmented using an augmentation logic. The augmentation logic can be constructed to detect false peaks in $P_{FFT}$, if the value of the Doppler shift of the propagation channel is too low. A test metric can be formulated as described below, for determining whether the augmentation logic needs to be implemented when the computation on the multiple channel quality reports for estimating the TC of the propagation channel is performed.

Considering the vector S', the test metric can be calculated as:

$$\text{Test\_metric} = \text{var}\{S'(1:\text{end}-1) - S'(2:\text{end})\}$$

Where:
var denotes the variance; and
end denotes the total size of the vector S'.

In an embodiment, a predefined threshold that may be equal to 3 can be assigned to the test metric, prior to performing the computation on the multiple channel quality reports for estimating the TC of the propagation channel. Upon calculating the test metric, if the value of the test metric is less than the predefined threshold, it may be declared that the Doppler shift of the propagation channel is too low to be measured. On the contrary, if the value of the test metric is more than the predefined threshold, the above described method for performing computation on the multiple channel quality reports can be implemented normally.

Figure 6:
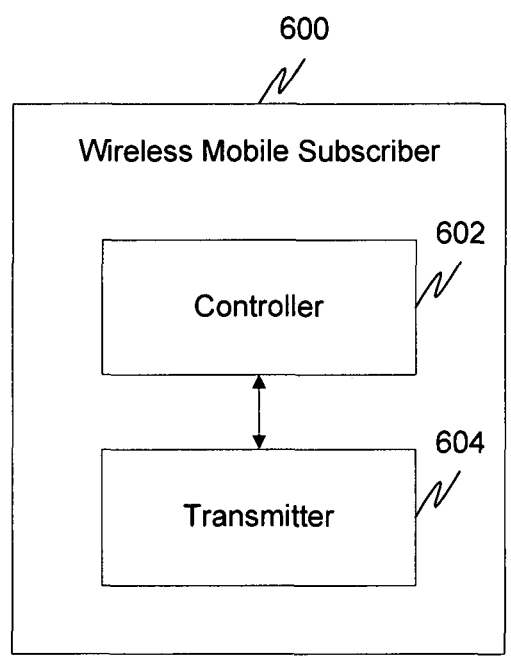
FIG. 6 is a block diagram showing a wireless mobile subscriber for estimating TC of a propagation channel in a communication network, in accordance with an embodiment.

FIG. 6 is a block diagram showing a wireless mobile subscriber 600 for estimating TC of a propagation channel in communication network 110, in accordance with an embodiment. Wireless mobile subscriber 600 includes a controller 602 and a transmitter 604. Controller 602 is operatively coupled to transmitter 604. Further, controller 602 is configured to generate multiple channel quality reports of the propagation channel in communication network 110. Controller 602 is further configured to estimate the TC of the propagation channel based on the multiple channel quality reports. This has been explained in detail in conjunction with FIG. 3 given above. Transmitter 604 of wireless mobile subscriber 600 can be configured to transmit information related to the estimated TC of the propagation channel to a wireless base station.

Figure 7:
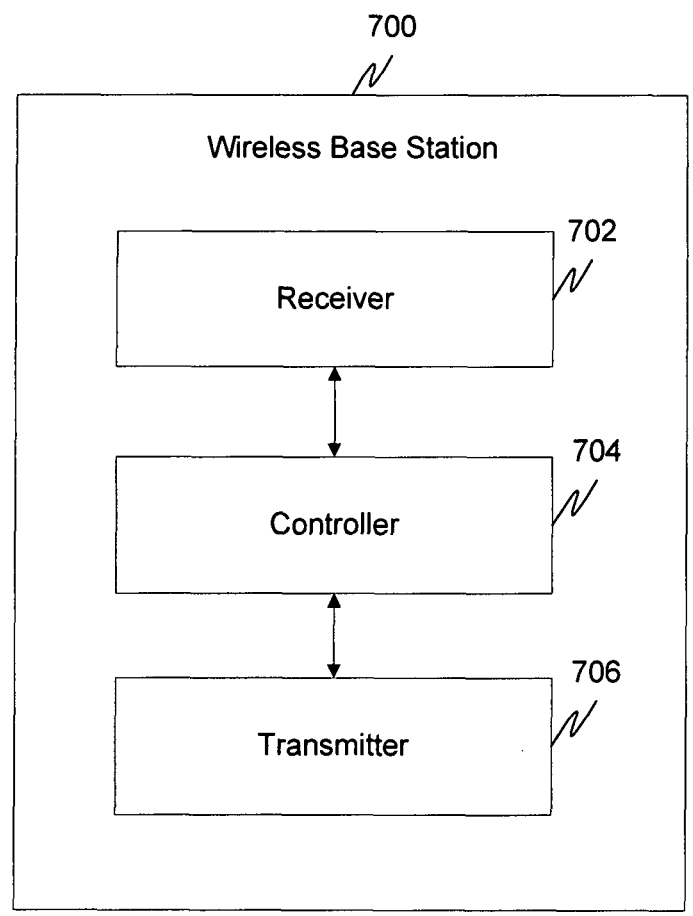
FIG. 7 is a block diagram showing a wireless base station for estimating TC of a propagation channel in a communication network, in accordance with an embodiment.

FIG. 7 is a block diagram showing a wireless base station 700 for estimating TC of a propagation channel in communication network 110, in accordance with an embodiment. Wireless base station 700 includes a receiver 702, a controller 704, and a transmitter 706. Receiver 702 is configured to receive multiple channel quality reports of the propagation channel transmitted from a wireless mobile subscriber. Further, controller 704 is configured to determine the TC of the propagation channel in communication network 110 based on the received multiple channel quality reports. This has been explained in detail in conjunction with FIG. 4 given above.

Additionally, controller 704 is configured to measure variation between the multiple channel quality reports of the propagation channel. Controller 704 determines the feedback rate of the multiple channel quality reports based on the measured variation. For this, controller 704 compares the measured variation between the multiple channel quality reports with the predefined value, related to a feedback rate of the multiple channel quality reports transmitted from the wireless mobile subscriber. Accordingly, controller 704 may increase or decrease the feedback rate based on the comparison. This has been explained in detail in conjunction with FIG. 5 given above. Thereafter, transmitter 706 transmits the feedback rate of the multiple channel quality reports determined at wireless base station 700 to the wireless mobile subscriber.

Various embodiments of the invention provide methods and systems for estimation of TC of a propagation channel in a communication network. The TC is estimated at wireless base station and/or a wireless mobile subscriber in the communication network based on multiple channel quality reports. The multiple channel quality reports transmitted from a wireless mobile subscriber to a wireless base station may be secured using repetition coding to assure high reliability of information contained within the multiple channel quality reports. Further, repetition coding of multiple channel quality reports mitigates the effects of interference variation encountered during explicit measurements relating to TC of the propagation channel in the UL transmission. Furthermore, effects arising due to the bursty nature of UL transmission can be alleviated due to the scheduling of UL transmission from the wireless mobile subscriber to the wireless base station as periodic regularized messages. Moreover, the repetitive process of changing the feedback rate of the multiple channel quality reports performed at the wireless base station, for compensating the measured variation between the multiple channel quality reports can be utilized to optimize feedback resources in the wireless base station. Further, an optimized estimation of the propagation channel can be achieved using the TC of the propagation channel estimated in UL transmission.

What is claimed is:

1. A method of estimating temporal correlation of a propagation channel, comprising:
   in a wireless mobile subscriber terminal:
   obtaining multiple channel quality reports of the propagation channel; and
   estimating the temporal correlation of the propagation channel based on the multiple channel quality reports wherein said estimating the temporal correlation comprises:
   processing the multiple channel quality reports; and
   spectrally analyzing processed multiple channel quality reports, the spectral analysis including determining a Doppler shift associated with the propagation channel using autocorrelation of the processed multiple channel quality reports.

2. The method of claim 1, wherein the obtaining comprises generating the multiple channel quality reports by the wireless mobile subscriber terminal.

3. The method of claim 1, wherein the multiple channel quality reports comprise propagation channel measurements of at least one of receive signal strength indication (RSSI), signal-to-noise ratio (SNR) and signal-to-interference-plus-noise ratio (SINR) of signals transmitted through the propagation channel.

4. The method of claim 1, wherein the spectrally analyzing includes using a Fast Fourier Transform.

5. The method of claim 1, wherein the spectrally analyzing includes using a reduced point Fast Fourier Transform.

6. The method of claim 1, further comprising:
calculating a test metric based on a variance of differences between signal-to-noise-ratio (SNR) values in adjacent frames;
determining a validity of the Doppler shift based on a comparison of the calculated test metric and a predetermined threshold.

7. A method of estimating temporal correlation of a propagation channel, comprising:
in a wireless base station:
receiving multiple channel quality reports of the propagation channel from a wireless mobile subscriber terminal; and
estimating the temporal correlation of the propagation channel based on the multiple channel quality reports wherein said estimating the temporal correlation comprises:
processing the multiple channel quality reports; and
spectrally analyzing processed multiple channel quality reports, the spectral analysis including determining a Doppler shift associated with the propagation channel using autocorrelation of the processed multiple channel quality reports.

8. The method of claim 7, further comprising:
the wireless base station measuring variation between the multiple channel quality reports; and
specifying, to the wireless mobile subscriber terminal, a feedback rate of the multiple channel quality reports based on the measured variations.

9. The method of claim 8, further comprising:
comparing the variation between the multiple channel quality reports with a predefined value.

10. The method of claim 9, further comprising:
increasing the feedback rate of the multiple channel quality reports, if the measured variation is above the predefined value.

11. The method of claim 9, further comprising:
decreasing the feedback rate of the multiple channel quality reports, if the measured variation is below the predefined value.

12. The method of claim 7, wherein the spectrally analyzing includes using a Fast Fourier Transform.

13. The method or claim 7, further comprising:
calculating a test metric based on a variance of differences between signal-to-noise-ratio (SNR) values in adjacent frames;
determining a validity of the Doppler shift based on a comparison of the calculated test metric and a predetermined threshold.

14. A wireless mobile subscriber terminal for estimating temporal correlation of a propagation channel, the wireless mobile subscriber terminal comprising:
a controller, the controller configured to:
generate multiple channel quality reports of the propagation channel; and
estimate the temporal correlation of the propagation channel based on the multiple channel quality reports, wherein said estimation of the temporal correlation comprises:
processing the multiple channel quality reports; and
spectrally analyzing the processed multiple channel quality reports, the spectral analysis including determining a Doppler shift associated with the propagation channel using autocorrelation of the processed multiple channel quality reports.

15. The wireless mobile subscriber terminal of claim 14, further comprising:
a transmitter, the transmitter being configured to transmit the estimated temporal correlation of the propagation channel to a wireless base station.

16. The wireless mobile subscriber terminal of claim 14, wherein the spectrally analyzing includes using a Fast Fourier Transform.

17. The wireless mobile subscriber terminal of claim 14, wherein the spectrally analyzing includes using a reduced point Fast Fourier Transform.

18. The wireless mobile subscriber terminal of claim 14, wherein the controller is further configured to:
calculate a test metric based on a variance of differences between signal-to-noise-ratio (SNR) values in adjacent frames;
determine a validity of the Doppler shift based on a comparison of the calculated test metric and a predetermined threshold.

19. A wireless base station for determining temporal correlation of a propagation channel, the wireless base station comprising:
a receiver configured to receive multiple channel quality reports of the propagation channel from a wireless mobile subscriber terminal; and
a controller configured to determine the temporal correlation of the propagation channel based on the multiple channel quality reports, said determination of the temporal correlation comprising:
processing the multiple channel quality reports; and
spectrally analyzing the processed multiple channel quality reports, the spectral analysis including determining a Doppler shift associated with the propagation channel using autocorrelation of the processed multiple channel quality reports.

20. The wireless base station of claim 19, wherein the controller is further configured to:
measure variation between the multiple channel quality reports; and
determine a feedback rate of the multiple channel quality reports based on the measured variations.

21. The wireless base station of claim 20, further comprising:
a transmitter, the transmitter being configured to transmit the feedback rate of the multiple channel quality reports to the wireless mobile subscriber terminal.

22. The wireless base station of claim 19, wherein the spectrally analyzing includes using a Fast Fourier Transform.

23. The wireless base station of claim 19, wherein the spectrally analyzing includes using a reduced point Fast Fourier Transform.

24. The wireless base station of claim 19, wherein the controller is further configured to:
calculate a test metric based on a variance of differences between signal-to-noise-ratio (SNR) values in adjacent frames;
determine a validity of the Doppler shift based on a comparison of the calculated test metric and a predetermined threshold.

* * * * *